April 25, 1961 D. E. NASONI 2,981,935

MAGNETIC STORAGE DEVICE

Filed Oct. 13, 1958

*INVENTOR.*
DONALD E. NASONI

*BY* Francis A. Varallo
AGENT

United States Patent Office 2,981,935

Patented Apr. 25, 1961

2,981,935

MAGNETIC STORAGE DEVICE

Donald E. Nasoni, Wayne, Pa., assignor to Burroughs Corporation, Detroit, Mich., a corporation of Michigan Filed Oct. 13, 1958, Ser. No. 767,043

8 Claims. (Cl. 340—174)

This invention relates generally to data processing and computing equipment and more specifically to a magnetic memory device for the storage of fixed information.

Fixed program computers in which specific instructions are carried out in a definite sequence are widely used. The instructions, as well as other constant information, are stored in the computer memory. Magnetic drums, tapes, or wired cores, are but a few of numerous memory devices employed in such computers. Following is a consideration of some of the limitations of the aforementioned devices.

Magnetic drums have the disadvantage of rotating parts which must be carefully machined and balanced. Thermal expansion makes it difficult to maintain a constant spacing between the drum track and head, and consequently, operation is restricted to narrow ranges of temperature. Poor vibration and shock characteristics, inflexible timing and a rather low output signal level make magnetic drums unsuitable for many purposes.

Magnetic tape has as its principal defect the unreliability inherent in the oxide coating of the acetate tape which deteriorates with repeated use. Also acetate tape tends to stiffen, and the oxide coating to flake off, during low temperature operation. Mylar tapes are superior in both of these respects, but the number of reliable readouts is nevertheless limited.

In order to impart some degree of flexibility to fixed program storage, it is desirable to be able to change the program by some means not affected by ordinary computer signals. In order to accomplish this, the means of changing the program should be entirely dissimilar to the usual mode of computer operation. The chief disadvantage of wired magnetic cores for fixed program storage is the difficulty of changing the program. In fact, the contents of the storage must be known before fabrication of the memory can begin. If a change in program is desired after the memory has been constructed, the entire device must be rewired.

It is therefore a general object of the instant invention to provide a magnetic fixed program storage device which is free of the aforementioned defects of memory devices;

Another object of the instant invention is to provide a memory device in which the stored information is evident by visual inspection of the device;

Another object of the present invention is to provide a memory device in which the stored program may be altered with relative ease;

A further object of the instant invention is to provide a memory system which requires only a short time between the retrieval of one instruction and the retrieval of the succeeding instruction;

A still further object of the instant invention is to provide a storage device which operates reliably under environmental conditions such as temperature, shock and vibration.

In accordance with the general features of the instant invention, information is stored in the memory unit by selectively positioning members, or slugs, of magnetic and non-magnetic material relative to adjacent groups of signal windings permanently disposed with respect to a shell of magnetic material. In the absence of a magnetic slug, or alternately stated, in the presence of a non-magnetic slug, the magnetic coupling between windings in a particular group or section is negligible due to the high reluctance of the path separating the windings. Conversely, a magnetic slug cooperates with said magnetic shell in establishing a flux path and providing a tight coupling among the signal windings associated therewith. In the former case involving a non-magnetic slug, the application of an interrogation or selector pulse to a primary or input winding of said group will induce only a small noise voltage in the other secondary or output windings of the group; in the latter case, an interrogation voltage pulse applied to the primary winding will induce a large signal voltage in the secondary windings. Thus, if an interrogation pulse is applied in common to all the primary windings of the memory device, an output signal voltage will result from all the secondary windings coupled with a magnetic slug and a smaller noise voltage, from output windings associated with non-magnetic slugs. In accordance with computer terminology the composite signals of the memory device comprise a binary word—the output signal voltages arbitrarily representing a binary "1"; the noise voltages a binary "0." The binary word supplied by the memory device is available each time the device is interrogated. Modification or correction of the word is easily accomplished by repositioning the magnetic and non-magnetic slugs.

Other objects and features of this invention, in addition to the aforementioned, may be most effectively observed with reference to the following description and accompanying drawings wherein.

Figure 1:
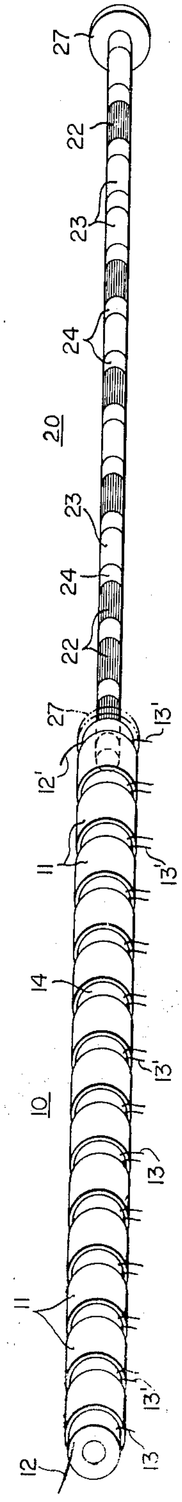
Fig. 1 depicts an embodiment of the basic storage unit of the instant invention comprising a "word-form" and a "word-plug," shown partially inserted therein.
Figure 2:
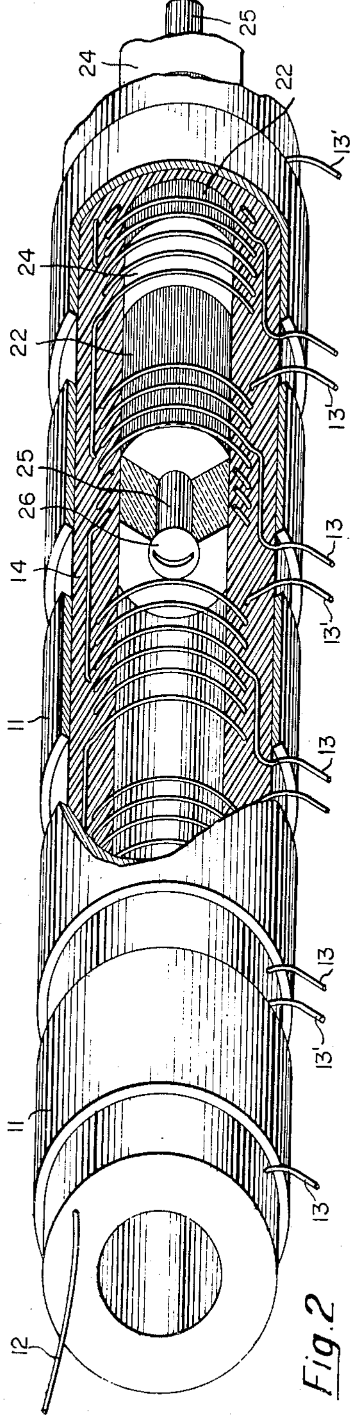
Fig. 2 is an enlarged view of the "word-form" cut away to show the "word-plug" within the "form."

In consideration of the specific embodiment of Figs. 1 and 2 the "word-form" 10 comprises a hollow, non-magnetic cylinder 14 of a plastic-type material in which a continuous, but sectionalized, primary or input winding 12—12′ has been encapsulated. Each section of the primary winding 12—12′ has a secondary winding 13—13′ situated adjacent to it and likewise encapsulated in the cylinder 14. Both the primary and secondary windings of each section are enclosed by a magnetic shell 11. The "word-plug" 20 comprises a shaft or rod 25 of non-magnetic material on which is loaded manually a sequence of hollow cylindrical magnetic or non-magnetic slugs, designated as 22 and 23 respectively. A non-magnetic spacer 24 is inserted between adjacent slugs. A handle 27 is attached to one end of the shaft 25 and serves as a stop when the rod is inserted in the cylinder 14. The other end of the shaft 25 is tapped to accommodate screw 26 which acts as a retainer for the slugs and spacers.

When the "word-plug" 20 has been completely inserted into the plastic cylinder 14 of the "word-form" 10, all primary-secondary sections are established as being with or without the magnetic core provided by slug 22. The non-magnetic spacers 24 provide a degree of magnetic isolation between the adjacent winding sections and are of the appropriate physical dimensions to insure that a magnetic slug 22, if present, will position under a magnetic shell 11. If the magnetic isolation and resultant high output signal-to-noise ratio provided by the spacers 24 are not required, the spacers may be eliminated. Obviously if this is done, the dimensions of the slugs must be altered to establish the proper physical relationship between slugs and winding sections.

Figure 3:
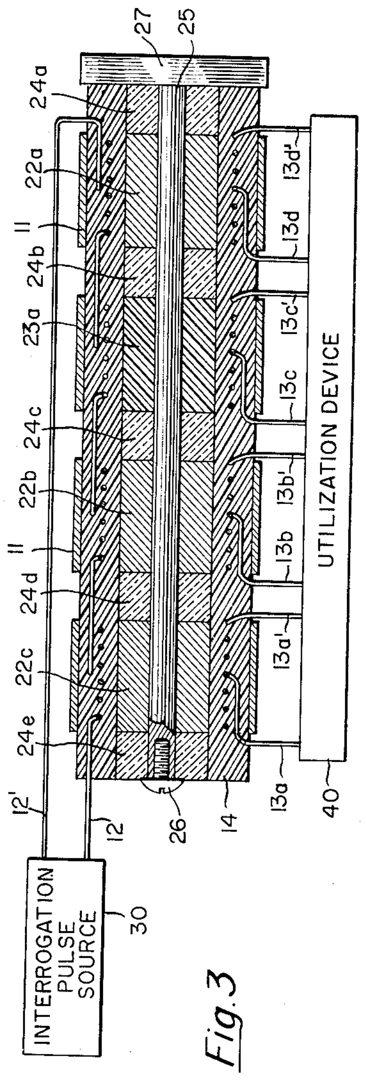
Fig. 3 illustrates an assembled view of a small storage unit capable of storing a binary word four bits in length.

The operation of the basic storage unit will now be described with reference to the smaller capacity device depicted in Fig. 3. Assume that the computer program requires that the binary word "1101" be read out of the memory unit upon command of a selector or interrogation pulse. The "word-plug" is prepared by loading on the rod 25 in sequence the following: a spacer 24*a*, a magnetic slug 22*a*, a spacer 24*b*, a non-magnetic slug 23*a*, a spacer 24*c*, a magnetic slug 22*b*, a spacer 24*d*, a magnetic slug 22*c*, and a spacer 24*e*. After the slugs and spacers have been secured by screw 26, the "word-plug" is inserted in the "word-form." Each of the slugs 22 or 23 represents a single bit of the binary word stored in the memory unit. The magnetic slugs 22*a*, 22*b* and 22*c* correspond to binary "1's," the non-magnetic slug 23*a*, a binary "0." If the materials used for the magnetic and non-magnetic slugs differ in appearance, visual inspection of the "word-plug" will reveal the binary word contained therein simply by noting the material occupying each section or position. If desired, color coding of the slugs may be employed to facilitate inspection.

Assume that an interrogation pulse is applied from source 30 to input winding 12—12′. Each magnetic slug 22*a*, 22*b* and 22*c* positioned under a magnetic shell 11 establishes therewith a magnetic flux path which links the primary winding 12—12′ with the secondary output windings 13(*a*—*a*′), 13(*b*—*b*′) and 13(*d*—*d*′) and an output signal voltage is induced across the latter secondary windings. Secondary winding 13(*c*—*c*′) having a non-magnetic core 23*a* associated therewith, develops only a small noise voltage due to the high reluctance of the path separating primary winding 12—12′ and secondary winding 13*c*—13*c*′. The voltages induced in all the secondary windings are fed to the utilization device 40 which senses and interprets them according to magnitude—the large signal voltages corresponding to binary "1's"; the noise voltages, binary "0's."

In practice the computer memory may consist of a group of the basic storage units depicted in Figs. 1 and 2 arranged in a sort of honeycomb. Each unit stores a single word which may represent either constant data or an instruction of the computer program. In such applications each "word-form" would have a common primary winding, while each of the secondaries in the respective "word-forms" representing the same bit position of the stored words, would be connected in series and fed in common to the utilization device. Circuit means would be provided in the computer for the selection and interrogation of the input primary windings of each of the word forms in the proper sequence.

From the foregoing description of the invention and its mode of operation, it will be evident that the instant magnetic storage device is particularly suited to applications requiring a simple, yet rugged and reliable device for providing non-volatile storage in which the information content may be easily altered. Therefore, while there have been shown and described the fundamental novel features of the invention as applied to a specific embodiment, it is to be understood that various omissions, substitutions and the changes in form and detail of the device illustrated, and in its operation, may be made by those skilled in the art without departing from the spirit of the invention. For example, the primary and secondary windings 12—12′ and 13—13′ are described as being encapsulated within the walls of cylinder 14. The latter cylinder may be replaced by one or more non-magnetic cylindrical members in which the primary and secondary windings are affixed to the outer surface thereof. Further, in some applications it may be advantageous to have separate primary windings associated with one or more secondary windings instead of the continuous sectionalized primary and separate secondary winding arrangement hereinbefore described.

The features of novelty believed descriptive of the nature of the invention are described with particularity in the appended claims.

What is claimed is:

1. A data storage device comprising in combination a plurality of signal windings separated into sections, a shell of magnetic material associated with each section, a plurality of members consisting, respectively, of either magnetic or non-magnetic material arranged in a predetermined sequence in accordance with the data to be stored in said device, each of said members being so positioned with respect to one of said sections that each magnetic member establishes with said magnetic shell a flux path linking all the windings in the section associated therewith, and each non-magnetic member provides a high reluctance flux path with resultant low magnetic coupling among the windings with which it is associated, means for interrogating the storage condition of each of said sections and for obtaining therefrom an output voltage whose amplitude is dependent upon the degree of magnetic coupling present therein, the plurality of output voltages obtained from said sections at the time of interrogation being representative of said stored data, and means for utilizing said output voltages.

2. A data storage device comprising in combination a plurality of windings arranged in the form of coils and separated into adjacent groups, a shell of magnetic material surrounding each of said groups of coils, a plurality of slugs consisting respectively of either magnetic or non-magnetic material arranged in a predetermined sequence in accordance with the data to be stored in said device, said slugs being positioned within the area enclosed by said coils, each of said groups of coils thereby encircling either a magnetic or a non-magnetic slug, means for interrogating the storage condition of each of said groups of coils and for obtaining therefrom an output voltage whose magnitude is a function of the slug material associated therewith, the output voltages obtained from said groups at the time of interrogation being representative of said stored data, and means coupled to said groups of coils for utilizing said output voltages.

3. A magnetic storage device comprising in combination a plurality of windings arranged in adjacent groups, each of said groups comprising at least a primary winding and a secondary winding, a shell of magnetic material encompassing each of said groups, a plurality of slugs consisting respectively of either magnetic or non-magnetic material adapted to be selectively positioned within the area enclosed by said windings, each of said groups of windings thereby encircling either a magnetic or a non-magnetic slug, each of said magnetic slugs establishing with said magnetic shell a flux path linking all the windings associated therewith, the windings encircling said non-magnetic slugs having little magnetic coupling therebetween due to the high reluctance of the flux path separating them from each other, said primary winding in each group being adapted to be pulsed from a source of interrogation current, the magnitude of the voltage induced across each secondary winding as a result of the interrogation current flowing through said primary windings being a function of the slugs associated respectively with said groups of windings.

4. A magnetic data storage device comprising in combination a plurality of windings arranged in adjacent groups, each of said groups comprising a section of a common primary winding and a secondary winding positioned adjacent to each primary winding section, a shell of magnetic material encompassing each of said groups, a plurality of slugs consisting, respectively, of either magnetic or non-magnetic material arranged in a predetermined sequence in accordance with the data to be stored in said device, a plurality of members of non-magnetic material situated between adjacent slugs, said members providing magnetic isolation between said winding groups and serving to position said slugs with respect to said windings, each of said groups of windings thereby encircling either a magnetic or a non-magnetic slug, each of said magnetic slugs establishing with said magnetic shell a flux path linking the primary and secondary windings coupled thereto, each of said non-magnetic slugs providing a high reluctance flux path between the primary and secondary windings associated therewith, said common primary winding being adapted to be pulsed from a source of interrogation current, the magnitude of the output voltage induced across each secondary winding as a result of the interrogation current flowing through said common primary winding being a function of the degree of magnetic coupling provided by the slug material associated with each winding group, said output voltages being representative of the stored data, and means coupled to said secondary windings for utilizing said output voltages.

5. A magnetic device for storing a binary word in the form of "1's" and "0's" comprising in combination a plurality of windings arranged in adjacent sections, means for supporting said windings in an integral cylindrical structure, a cylindrical shell of magnetic material enclosing said structure, a plurality of slugs consisting respectively of either magnetic or non-magnetic material, means joining said plurality of slugs into a rod-like member having a sequence of slugs representative of the binary word to be stored in said device, said rod-like member being adapted for insertion in said cylindrical structure whereby each of said slugs is positioned under one of said winding sections, a first of said windings in each section being adapted to be pulsed from a source of interrogation current, the magnitude of the output voltage induced in a second of said windings in each section as a result of said interrogation current flow in said first winding being a function of the slug material positioned under each section, each magnetic slug establishing with said magnetic shell a flux path linking all the windings coupled thereto, the windings associated with a non-magnetic slug possessing little magnetic coupling therebetween due to the high reluctance of the path separating the windings from each other, a large output voltage representative of a binary "1" being obtained at the time of interrogation from said second windings in each section having a magnetic slug and a small noise voltage representative of a binary "0" being obtained from said second windings in each section having a non-magnetic slug, and means coupled to said second windings for utilizing said output voltages.

6. A magnetic device for storing the bits of a binary word in the form of "1's" and "0's," comprising in combination a hollow cylinder of non-magnetic material, a plurality of signal windings separated into similar groups and encapsulated within the walls of said cylinder, a cylindrical shell of magnetic material enclosing each of said groups of signal windings, a plurality of slugs consisting respectively of either magnetic or non-magnetic material, means fashioning said plurality of slugs into a rod-like member, each of said slugs representing a binary bit of the word stored in said magnetic device, said rod-like member being adapted for insertion in said hollow cylinder whereby each of said slugs is positioned under one of said winding groups, a first of said windings in each group being adapted to be pulsed from a source of interrogation current, the magnitude of the output voltage induced in a second of said windings in each group as a result of said interrogation current flow, being a function of the slug material positioned under each group of windings, each magnetic slug establishing with said magnetic shell a flux path linking all the windings coupled thereto, the windings associated with a non-magnetic slug possessing little magnetic coupling therebetween due to the high reluctance of the path separating the windings from each other, a signal output voltage representative of a binary "1" being read out at interrogation time from said second windings in each group having a magnetic slug and a noise output voltage representative of a binary "0" being read out from said second windings in each section having a non-magnetic slug, and means coupled to said second windings for utilizing said output voltages.

7. A magnetic storage device as defined in claim 6 wherein said means for fashioning said slugs into a rod-like member comprises a shaft of non-magnetic material, each of said slugs being formed as hollow cylindrical members and being adapted to be loaded upon said shaft in a predetermined sequence, and means for retaining said slugs in a fixed position on said shaft.

8. A magnetic data storage device comprising in combination a hollow cylinder of non-magnetic material, a plurality of signal windings separated into groups and encapsulated within the walls of said cylinder, each of said groups of windings comprising a section of a common primary winding and a secondary winding positioned adjacent to each primary winding section, a cylindrical shell of magnetic material surrounding each of said groups of signal windings, a plurality of slugs consisting respectively of either magnetic or non-magnetic material formed as tubular members, a shaft of non-magnetic material, said slugs being adapted for loading upon said shaft in a predetermined sequence in accordance with the data to be stored, said shaft with its full complement of slugs being inserted in said hollow cylinder whereby each of said slugs is positioned under one of said winding groups, each of said magnetic slugs establishing with said magnetic shell a flux path linking the primary and secondary windings coupled thereto, each of said non-magnetic slugs providing a high reluctance flux path with resultant low magnetic coupling between the primary and secondary windings associated therewith, said primary winding being adapted to be pulsed from a source of interrogation current, the magnitude of the output voltage induced across each secondary winding as a result of the interrogation current flowing through said common primary winding being dependent upon the degree of the magnetic coupling provided by the slug material associated with each winding group, said output voltages being representative of the stored data, and utilization means coupled to said secondary windings for sensing and interpreting said output voltages.

References Cited in the file of this patent

UNITED STATES PATENTS

| | | |
|---|---|---|
| 2,450,192 | Freeman | Sept. 28, 1948 |
| 2,560,946 | Gossick | July 17, 1951 |